United States Patent
Chiang et al.

(10) Patent No.: US 12,548,057 B2
(45) Date of Patent: Feb. 10, 2026

(54) ASSORTMENT PLANNING METHOD, ASSORTMENT PLANNING SYSTEM AND PROCESSING APPARATUS THEREOF FOR SMART STORE

(71) Applicant: INDUSTRIAL TECHNOLOGY RESEARCH INSTITUTE, Hsinchu (TW)

(72) Inventors: Chi-Chou Chiang, Hsinchu (TW); Hsin-Chien Huang, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 198 days.

(21) Appl. No.: 17/562,823

(22) Filed: Dec. 27, 2021

(65) Prior Publication Data

US 2023/0169567 A1    Jun. 1, 2023

(30) Foreign Application Priority Data

Dec. 1, 2021    (TW) .................... 110144903

(51) Int. Cl.
  *G06Q 30/00*    (2023.01)
  *G06Q 30/0201*    (2023.01)
  (Continued)

(52) U.S. Cl.
  CPC ..... *G06Q 30/0631* (2013.01); *G06Q 30/0201* (2013.01); *G06Q 30/0255* (2013.01); *G06Q 30/0641* (2013.01); *G06Q 30/06313* (2025.08)

(58) Field of Classification Search
  CPC ........... G06Q 30/0202; G06Q 30/0201; G06Q 30/02; G06Q 30/0641; G06Q 30/0255; G06Q 30/0631; G06Q 30/06313
  See application file for complete search history.

(56) References Cited

U.S. PATENT DOCUMENTS

| | | |
|---|---|---|
| 8,321,260 B2 | 11/2012 | Bottom |
| 8,417,559 B2 | 4/2013 | Joshi et al. |

(Continued)

FOREIGN PATENT DOCUMENTS

| | | |
|---|---|---|
| CN | 105518734 A | 4/2016 |
| CN | 104933710 B | 6/2018 |

(Continued)

OTHER PUBLICATIONS

"Assortment Planning for Multiple Chain Stores," by Hans Corsten, Michael Hopf, Benedikt Kasper, and Clemens Thielen, OR Spectrum 40: 875-912, (2018) (Year: 2018).*

(Continued)

*Primary Examiner* — Anne M Georgalas
(74) *Attorney, Agent, or Firm* — Birch, Stewart, Kolasch & Birch, LLP

(57) ABSTRACT

An assortment planning method, an assortment planning system and a processing apparatus thereof for a smart store are provided. The assortment planning system includes at least one tracking apparatus, a plurality of detecting apparatuses, and a processing apparatus. The tracking apparatus is used to identify a plurality of consumer tracks. The detecting apparatuses are used to detect a plurality of consumer interactive behaviors of a plurality of products. The processing apparatus includes a binding device, an intention analyzing device and an estimating device. The binding device is used to bind the consumer interactive behaviors with the consumer tracks to obtain a number of interactive behavior time sequence records. The intention analyzing device is used to obtain a plurality of consumption intentions for the products according to the interactive behavior time sequence records. The estimating device is used to estimate a best product combination according to the consumption intentions.

4 Claims, 9 Drawing Sheets

(51) Int. Cl.
    *G06Q 30/0251*     (2023.01)
    *G06Q 30/0601*     (2023.01)

(56) References Cited

U.S. PATENT DOCUMENTS

| | | | |
|---|---|---|---|
| 9,805,333 B1* | 10/2017 | Bergstrom | G06Q 10/04 |
| 10,282,852 B1 | 5/2019 | Buibas et al. | |
| 10,339,476 B1* | 7/2019 | Bergstrom | G06Q 10/0631 |
| 10,388,019 B1 | 8/2019 | Hua et al. | |
| 10,878,476 B2 | 12/2020 | Chaneton et al. | |
| 10,997,615 B1* | 5/2021 | Alvarez | G06F 30/00 |
| 11,132,737 B2* | 9/2021 | Glaser | G06Q 30/0635 |
| 11,704,725 B1* | 7/2023 | Fitzgerald | G06N 3/084 |
| | | | 705/26.3 |
| 2003/0171979 A1* | 9/2003 | Jenkins | G06Q 10/06375 |
| | | | 705/35 |
| 2005/0114196 A1* | 5/2005 | Schoenmeyr | G06Q 10/04 |
| | | | 705/7.29 |
| 2009/0271245 A1* | 10/2009 | Joshi | G06Q 30/0202 |
| | | | 705/7.31 |
| 2010/0250329 A1* | 9/2010 | Sanli | G06Q 10/04 |
| | | | 705/400 |
| 2011/0276364 A1 | 11/2011 | Bergstrom et al. | |
| 2013/0054310 A1* | 2/2013 | Sickenius | G06Q 30/02 |
| | | | 705/7.39 |
| 2013/0085893 A1* | 4/2013 | Bhardwaj | G06Q 30/0629 |
| | | | 705/26.62 |
| 2014/0025420 A1* | 1/2014 | Joshi | G06Q 10/04 |
| | | | 705/7.23 |
| 2015/0051936 A1 | 2/2015 | Chien et al. | |
| 2020/0005209 A1 | 1/2020 | Rangarajan et al. | |
| 2020/0118400 A1 | 4/2020 | Zalewski et al. | |
| 2021/0065262 A1 | 3/2021 | Chang et al. | |

FOREIGN PATENT DOCUMENTS

| | | |
|---|---|---|
| CN | 105184258 B | 4/2019 |
| CN | 109711895 A | 5/2019 |
| CN | 110276298 A | 9/2019 |
| CN | 111967947 A | 11/2020 |
| CN | 112085519 A | 12/2020 |
| CN | 109919688 B | 3/2021 |
| TW | I629654 B | 7/2018 |
| TW | 202029078 A | 8/2020 |
| TW | 202030672 A | 8/2020 |
| TW | 202032461 A | 9/2020 |
| TW | I745653 B | 11/2021 |

OTHER PUBLICATIONS

"The technology and trends that are fast becoming table stakes as they transform the grocery business", by Mike Troy, Abby Kleckler and Lynn Petrak, Progressive Grocer, Dec. 2019 (Year: 2019).*

"An adaptive population multi-objective quantum-inspired evolutionary algorithm for multi-objective 0/1 knapsack problems", by Tzyy-Chyang Lu and Gwo-Ruey Yu, Information Sciences 243 (2013) 39-56 (Year: 2013).*

Taiwanese Office Action and Search Report for Taiwanese Application No. 110144903, dated Jul. 18, 2022.

Chinese Office Action and Search Report for Chinese Application No. 202111566370.8, dated Jun. 20, 2025.

* cited by examiner

ASSORTMENT PLANNING METHOD, ASSORTMENT PLANNING SYSTEM AND PROCESSING APPARATUS THEREOF FOR SMART STORE

This application claims the benefit of Taiwan application Serial No. 110144903, filed Dec. 1, 2021, the disclosure of which is incorporated by reference herein in its entirety.

TECHNICAL FIELD

The disclosure relates in general to an assortment planning method, an assortment planning system and a processing apparatus thereof for a smart store.

BACKGROUND

The smart store is gradually moving towards miniaturization. The reduction in the store space has led to a reduction in product items that can be listed. In order to increase profits, assortment planning has become more important.

In addition, the smart store is also developing towards localization, in-depth in different regions. Generally speaking, the consumption habits of different regions are not the same. Even consumers in different periods of time will change. In order to increase profits, how to plan assortment according to different consumption habits has become an important goal of research and development.

SUMMARY

The disclosure is directed to an assortment planning method, an assortment planning system and a processing apparatus thereof for a smart store.

According to one embodiment, an assortment planning method for a smart store is provided. The assortment planning method for the smart store includes the following steps. A plurality of consumer tracks are identified. A plurality of consumer interactive behaviors of a plurality of products are detected. The consumer interactive behaviors at least include a taking behavior and a putting back behavior. The consumer interactive behaviors and the consumer tracks are bound, to obtain a plurality of interactive behavior time sequence records. A plurality of consumption intentions are obtained according to the interactive behavior time sequence records. A best product combination is estimated according to the consumption intentions.

According to another embodiment, an assortment planning system for a smart store is provided. The assortment planning system for the smart store includes at least one tracking apparatus, a plurality of detecting apparatuses, and a processing apparatus. The tracking apparatus is configured to identify a plurality of consumer tracks. The detecting apparatuses are configured to detect a plurality of consumer interactive behaviors of a plurality of products. The consumer interactive behaviors at least include a taking behavior and a putting back behavior. The processing apparatus includes a binding device, an intention analyzing device, and an estimating device. The binding device is configured to bind the consumer interactive behaviors and the consumer tracks, to obtain a plurality of interactive behavior time sequence records. The intention analyzing device is configured to obtain a plurality of consumption intentions according to the interactive behavior time sequence records. The estimating device is configured to estimate a best product combination according to the consumption intentions.

According to an alternative embodiment, a processing apparatus of an assortment planning system for a smart store is provided. The processing apparatus includes a binding device, an intention analyzing device, and an estimating device. The binding device is configured to bind a plurality of consumer interactive behaviors and a plurality of consumer tracks, to obtain a plurality of interactive behavior time sequence records. The intention analyzing device is configured to obtain a plurality of consumption intentions according to the interactive behavior time sequence records. The estimating device is configured to estimate a best product combination according to the consumption intentions.

Figure 1:
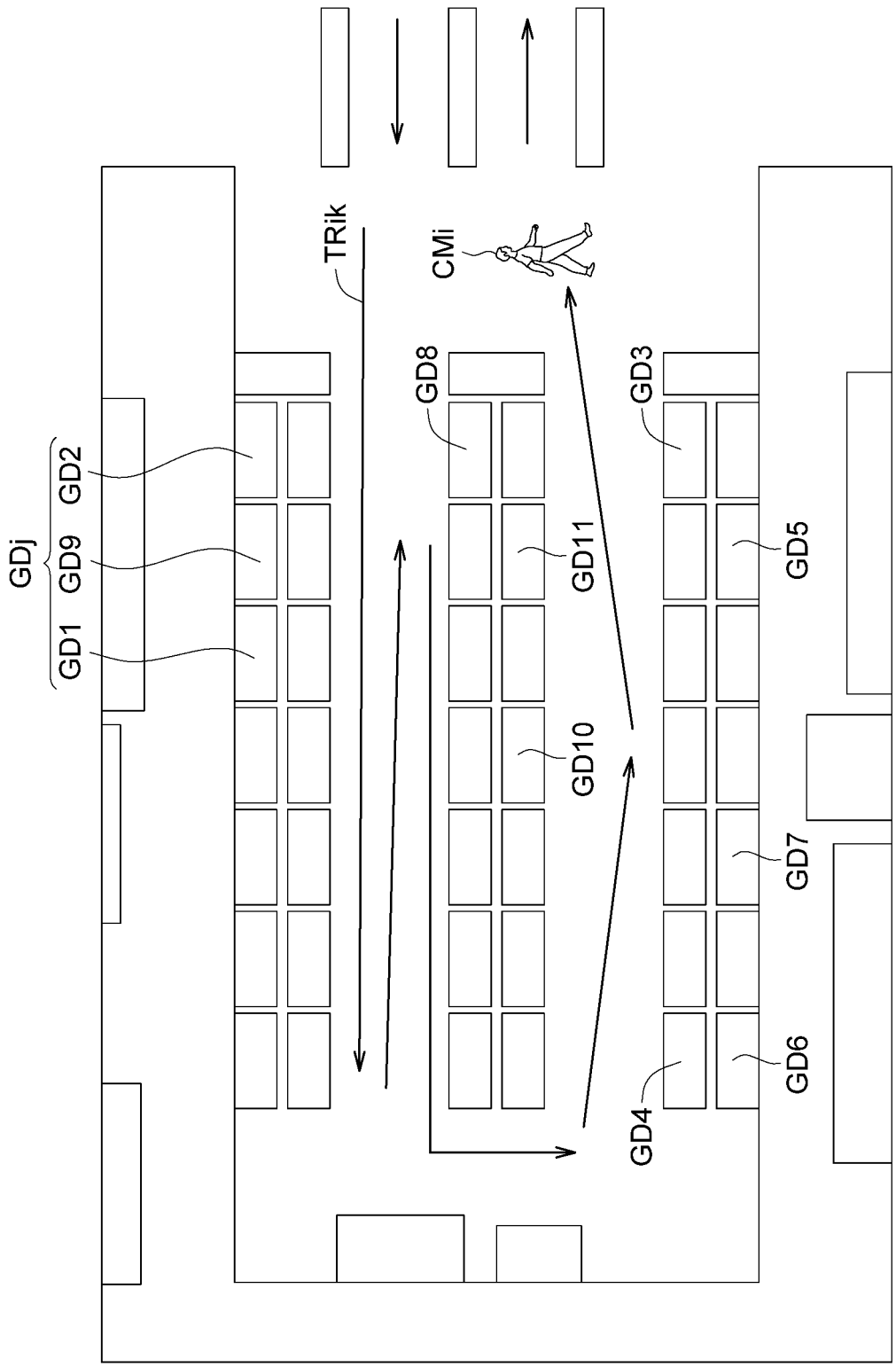
FIG. 1 shows a schematic view of a smart store according to an embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Please refer to FIG. 1, which shows a schematic view of a smart store 900 according to an embodiment. The space in the smart store 900 is quite limited, and there are not many items of products GDj that could be displayed, so effective assortment planning must be carried out. The products GDj are, for example, products GD1 to GD11. For consumers CMi at different time periods, different assortments are also required.

Figure 2:
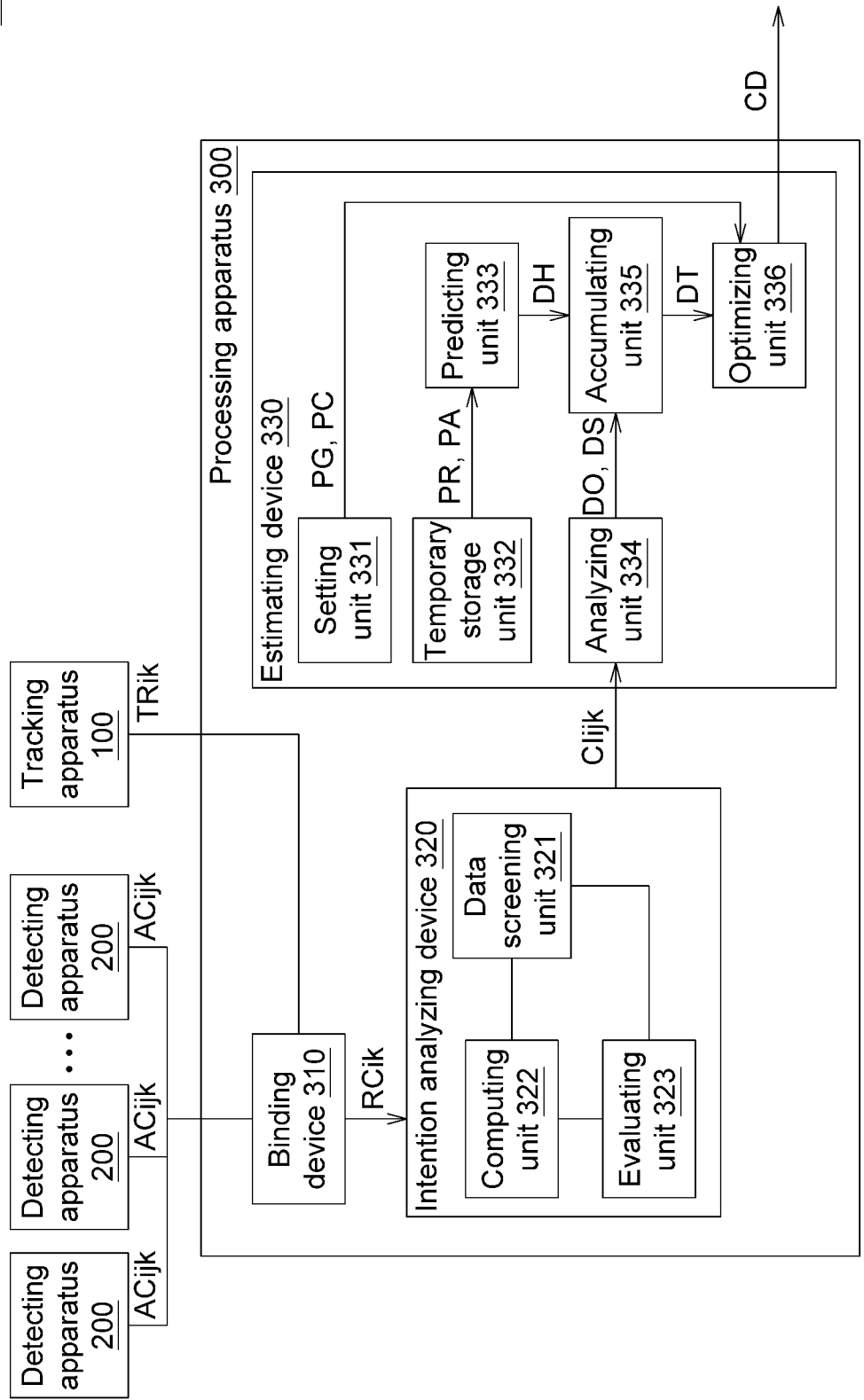
FIG. 2 illustrates a schematic diagram of an assortment planning system for the smart store according to an embodiment.

Please refer to FIG. 2, which illustrates a schematic diagram of an assortment planning system 1000 for a smart store 900 according to an embodiment. The assortment planning system 1000 includes at least one tracking apparatus 100, a plurality of detecting apparatuses 200, and a processing apparatus 300. The tracking apparatus 100 is used to identify a consumer track TRik when one consumer CMi enters the store at a certain time. The tracking apparatus 100 is, for example, an image recognition device, an infrared sensor, or a microwave sensor. As shown in FIG. 1, the consumer track TRik not only records the location in the smart store 900, but also records time information.

The detecting apparatuses 200 are used to detect a plurality of consumer interactive behaviors ACijk of the products GDj when the consumer CMi enters the store at a certain time. The consumer interactive behaviors ACijk include, for example, a taking behavior, a putting back behavior, a staying behavior, a viewing advertisement behavior, an inspecting behavior, a gazing behavior, a taking photo behavior, and a comparison behavior. Each of the detecting apparatuses 200 is, for example, a weight sensor, an infrared sensor, a magnetron element, an image recognizer, an RFID sensor, etc.

The processing apparatus 300 is used to analyze a plurality of consumption intentions Clijk of the products GDj in the store according to the consumer tracks TRik and the consumer interactive behaviors ACijk. The consumption intentions Clijk include, for example, a target product, an associated product, a substitute product, an interest product, a sold out target product, and an unlisted target product. The processing apparatus 300 estimates a best product combination CD of the products GDj according to the consumption intentions Clijk.

The processing apparatus 300 includes a binding device 310, an intention analyzing device 320 and an estimating device 330. The function of each component is summarized as follows. The binding device 310 is used to bind the consumer interactive behaviors ACijk and the consumer tracks TRik. The intention analyzing device 320 is used to obtain the consumption intentions Clijk of the products GDj. The estimating device 330 is used to estimate the best product combination CD of the products GDj.

Figure 3:
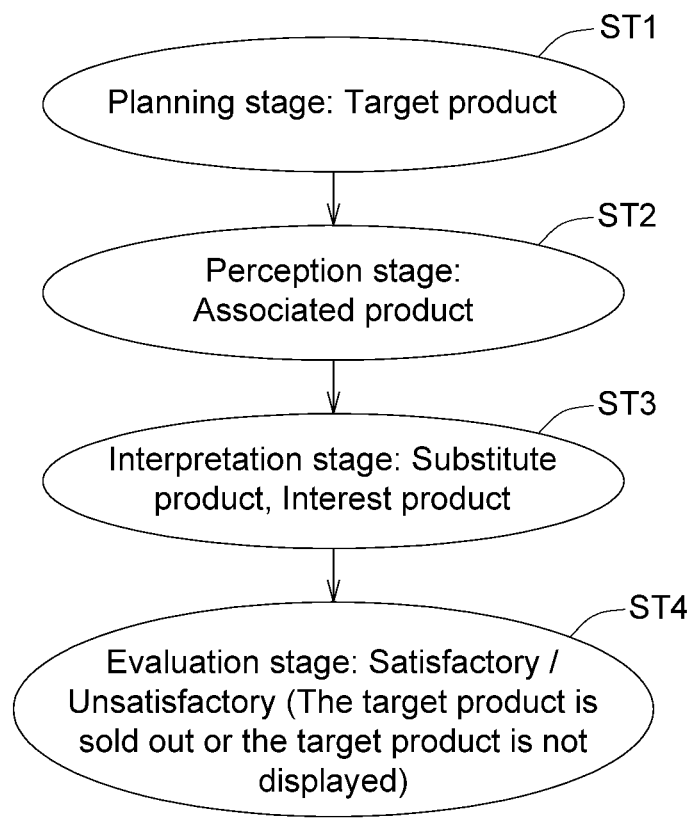
FIG. 3 shows a consumer action cycle model according to an embodiment.

Please refer to FIG. 3, which shows a consumer action cycle model according to an embodiment. At the planning stage ST1, the intent of the consumer CMi entering the store is the target product. After the consumer CMi entered the store at the perception stage ST2, due to the influence of the in-store environment, new demand is generated and the product purchased is an associated product. At the interpretation stage ST3, after comparing with the target product, the product decided not to buy temporarily is a substitute product. If the target product is sold out, the consumer CMi may buy the substitute product. In addition, at the interpretation stage ST3, the consumer CMi has different degrees of interest in the products GDj, and the product that has not been purchased is an interest product. At the evaluation stage ST4, the consumer CMi evaluates the purchase list according to the target product in the planning stage ST1 to obtain satisfactory or unsatisfactory results. The unsatisfactory result includes that the target product is sold out or the target product is not displayed.

The above-mentioned consumer action cycle model is the consumption intentions Clijk of the products GDj for each of the consumers CMi in a certain time of entering the store. Without inquiring the consumer CMi face to face, it is not easy to know the consumption intentions Clijk of the products GDj. The intention analyzing device 320 of the processing apparatus 300 analyzes the consumption intentions Clijk according to the consumer interactive behaviors ACijk and the consumer tracks TRik that the consumer CMi enters the store. In addition, the estimating device 330 of the processing apparatus 300 estimates the best product combination CD of products GDj according to the consumption intentions Clijk. The processing apparatus 300 is a specific technical means for the cooperative operation of computer software and hardware resources. The following describes the operation of each component in detail through a flowchart.

Figure 4:
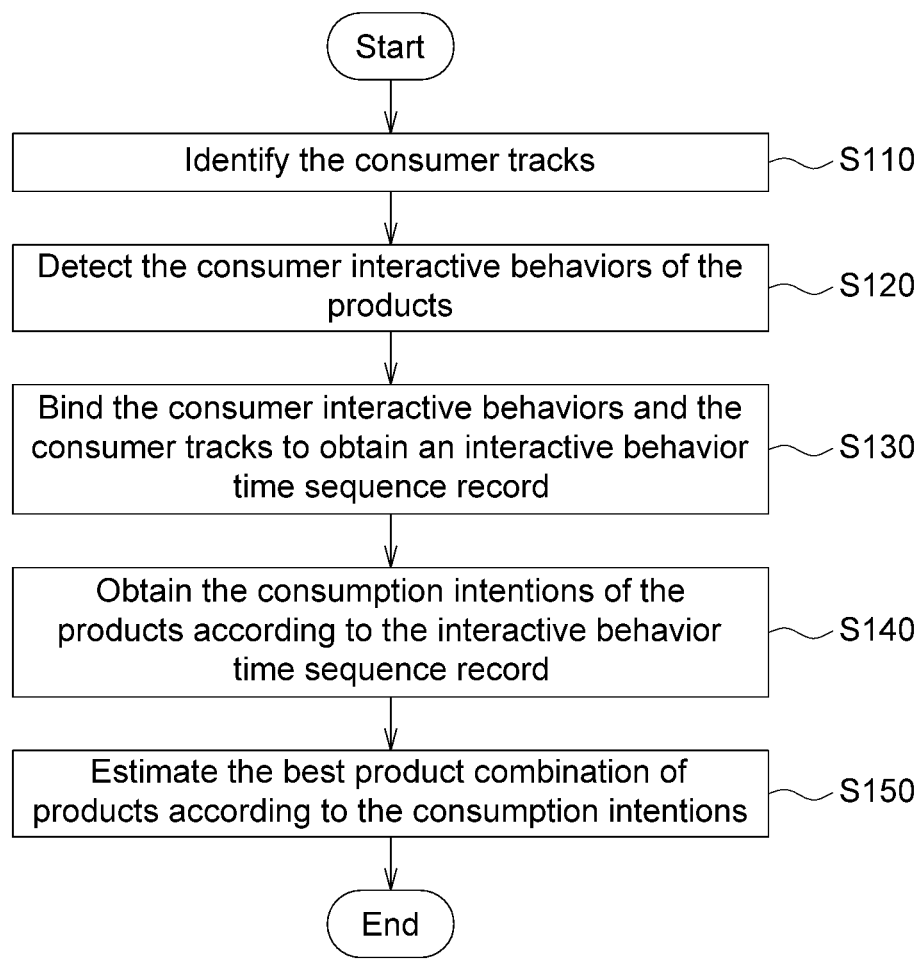
FIG. 4 shows a flowchart of an assortment planning method for the smart store according to an embodiment.

Please refer to FIG. 4, which shows a flowchart of an assortment planning method for a smart store according to an embodiment. In step S110, as shown in FIG. 1, the tracking apparatus 100 identify the consumer tracks TRik that consumer CMi enters the store at a certain time. In one embodiment, the tracking apparatus 100 is a wide-angle camera that shoots the entire store. The tracking apparatus 100 shoots from a bird's-eye view. The tracking apparatus 100 performs human recognition on each frame, and as long as the human is recognized, it is marked in the frame. The positions of the same human in the continuous frames will be continuously recorded to obtain the consumer track TRik of the consumer CMi. In the same frame, there may be more than two consumers CMi. The positions of different consumers CMi are individually linked to obtain different consumer tracks TRik. Each of the consumer tracks TRik contains time information. The appearance time and end time of different consumer tracks TRik are not necessarily the same.

In step S120, the detecting apparatus 200 detects the consumer interactive behaviors ACijk of the products GDj when the consumer CMi enters the store at a certain time. In one embodiment, the detecting apparatus 200 detects one or more products GDj to confirm whether the product GDj has been picked up by any consumer CMi, whether the product GDj has been put back by any consumer CMi, and whether any consumer CMi stand in the front of the product GDj, whether any consumer CMi views the advertisement, whether the product GDj is inspected by any consumer CMi, whether the product GDj is photographed by any consumer CMi, and whether the product GDj is picked up by any consumer CMi for comparison with other product GDj. The consumer interactive behaviors ACijk will be record with the corresponding products GDj and the time of occurrence, but it may not necessarily to record the consumer CMi that performed those actions.

The step S110 and the step S120 could be executed at the same time, without affecting each other. The consumer tracks TRik in the step 110 are recorded with time information, and the consumer interactive behaviors ACijk in the step S120 are also recorded with time information.

Then, in step S130, the binding device 310 binds the consumer interactive behaviors ACijk and the consumer tracks TRik to obtain an interactive behavior time sequence record RCik. The consumer tracks TRik in the step 110 and the consumer interactive behaviors ACijk in the step S120 could be bound via the time information. Please refer to Table 1, which shows an example of the interactive behavior time sequence record RCik.

TABLE I

| Track ID | Behavior ID | Number of behaviors | Date and time | Total time | Purchase ID |
|---|---|---|---|---|---|
| 1 | 1 | 22 | 2021 Jun. 14 12:00:00 | 16:30 | 3 |

| Track ID | Behavior ID | Behavior | Product | location | Time |
|---|---|---|---|---|---|
| 1 | 1 | Enter | | | |
| 1 | 2 | Take | A | 1-2 | 0:20 |
| 1 | 3 | Stay | | 1-2 | 0:30 |
| 1 | 4 | Take | E | 1-2 | 0:40 |
| 1 | 5 | Compare | A, E | 1-2 | 4:00 |
| 1 | 6 | Put back | E | 1-2 | 0:10 |
| 1 | 7 | Inspect | Inspect | 1-2 | 2:00 |
| 1 | 8 | Stay | | 1-5 | 0:30 |

TABLE I-continued

| 1 | 9  | Inspect      | B       | 1-5 | 1:00 |
|---|----|--------------|---------|-----|------|
| 1 | 10 | Taking photo | B       | 1-5 | 1:00 |
| 1 | 11 | Take         | B       | 1-5 | 0:15 |
| 1 | 12 | Take         | C       | 1-9 | 0:30 |
| 1 | 13 | Take         | D       | 2-3 | 0:30 |
| ... | ... | ...        | ...     | ... | ...  |
| 1 | 21 | Put back     | H       | 4-1 | 0:15 |
| 1 | 22 | Checkout     | A, B, C, D |   | 2:00 |

The interactive behavior time sequence record $RC_{ik}$ of Table 1 is one consumer track $TR_{ik}$ of the consumer $CM_i$ entering the store, which binds multiple consumer interactive behaviors $AC_{ijk}$. The same consumer may enter the store multiple times, so multiple interactive behavior time sequence records $RC_{ik}$ may be recorded.

Next, in step S140, the intention analyzing device 320 obtains the consumption intentions $CI_{ijk}$ of the products $GD_j$ according to the interactive behavior time sequence record $RC_{ik}$. The intention analyzing device 320 includes a data screening unit 321, a computing unit 322 and an evaluating unit 323. The data screening unit 321 is used for preliminary screening, the computing unit 322 is used for weighted calculation, and the evaluating unit 323 is used for classification and evaluation. The data screening unit 321, the computing unit 322 and/or the evaluating unit 323 is, for example, a circuit, a chip, a circuit board, a program module, a computer program product or a computer readable recording medium.

Figure 5:
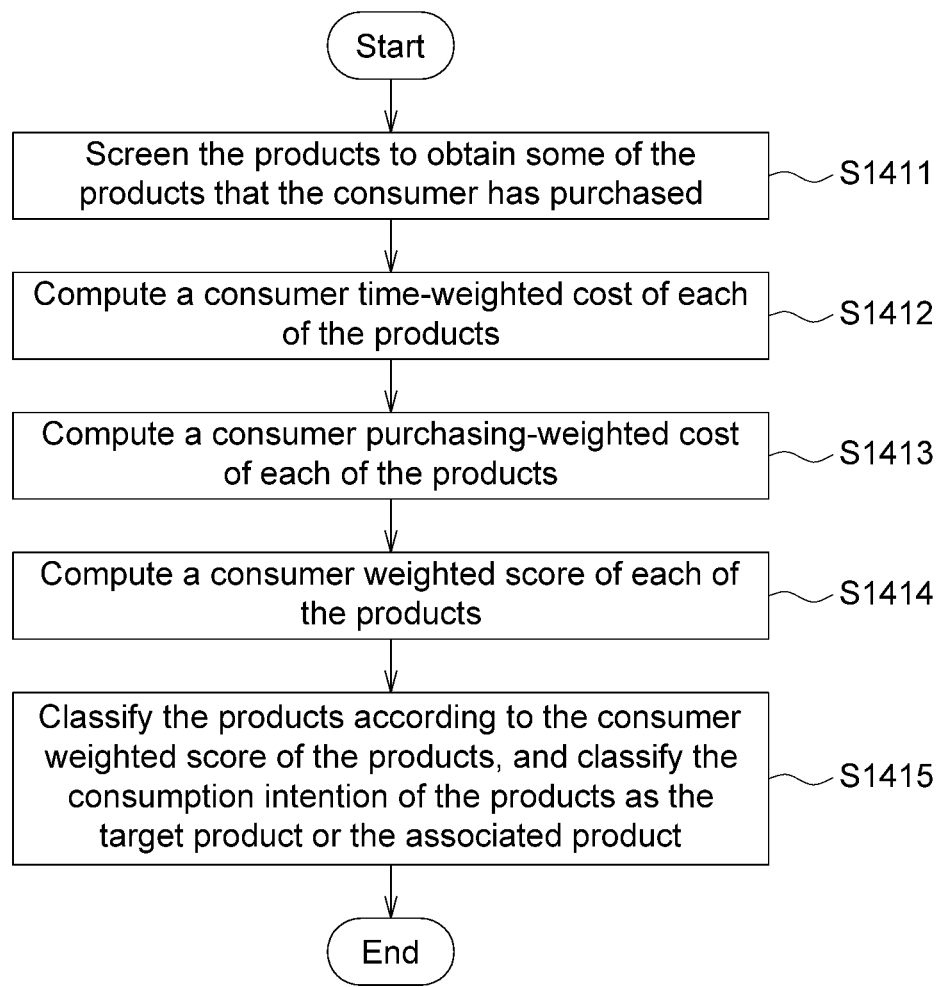
FIG. 5 shows a flowchart of a method for analyzing a target product and an associated product according to an embodiment.

For example, please refer to FIG. 5, which shows a flowchart of a method for analyzing the target product and the associated product according to an embodiment. First, in step S1411, the data screening unit 321 screens the products $GD_j$ to obtain the products GD1, GD2, GD3, GD4 that the consumer $CM_i$ has purchased. The purchased products GD1 to GD4 may be the target product or the associated product.

Then, in step S1412, the computing unit 322 computes a consumer time-weighted cost of each of the products GD1 to GD4. Compared with the associated product, the consumer $CM_i$ usually spends more time for the target product. In addition, the comparison behavior, the taking photo behavior, the inspecting behavior, the putting back behavior, the gazing behavior, the viewing advertisement behavior could give product attention weights according to Table II as below. The higher the product attention weight, the more likely it is the target product.

TABLE II

|  | Viewing advertisement behavior | Gazing behavior | Putting back behavior | Inspecting behavior | Taking photo behavior | Comparison behavior |
|---|---|---|---|---|---|---|
| Product attention weight | 0.1 | 0.3 | 0.5 | 0.8 | 0.9 | 1 |

The consumer $CM_i$ spent 7 minutes on the products GD1 to GD4. He spent 2 minutes for performing the comparison behavior on the product GD1 for, 2 minutes for performing the inspecting behavior on the product GD1, 1 minute for performing the gazing behavior on the product GD2, 1 minute for taking photo behavior on the product GD2, 0.5 minutes for viewing advertisement behavior on the product GD3, 0.5 minutes for gaining behavior on the product GD4.

The computing unit 322 could compute the consumer time-weighted cost of each of the products GD1 to GD4 according to the aforementioned consumer interactive behaviors $AC_{ijk}$, as described below.

The consumer time-weighted cost of the product GD1 is 0.515 (2/7*1+2/7*0.8=0.515).

The consumer time-weighted cost of the product GD2 is 0.172 (1/7*0.3+1/7*0.9=0.172).

The consumer time-weighted cost of the product GD3 is 0.007 (0.5/7*0.1=0.007).

The consumer time-weighted cost of the product GD4 is 0.021 (0.5/7*0.3=0.021).

Next, in step S1413, the computing unit 322 computes a consumer purchasing-weighted cost of each of the products GD1 to GD4. Compared with the associated product, the consumer $CM_i$ usually buys the target product first. According to the purchase order, the shopping order weight could be given in Table III below. The higher the shopping order weight, the more likely the target product is.

TABLE III

|  | 1 | 2 | 3 | 4 | 5 | 6 |
|---|---|---|---|---|---|---|
| Shopping order weight | 1 | 0.9 | 0.8 | 0.7 | 0.6 | 0.5 |

The consumer $CM_i$ spent a total of 250 dollars on the products GD1 to GD4. 100 dollars were spent on the product GD1; 70 dollars were spent on the product GD2; 30 dollars were spent on the product GD3; and 50 dollars were spent on the product GD4.

The computing unit 322 could calculate the consumer purchasing-weighted cost of each of the products GD1 to GD4 corresponding to the purchase order, as described below.

The consumer purchasing-weighted cost of the product GD1 is 0.4 (100/250'1=0.4).

The consumer purchasing-weighted cost of the product GD2 is 0.252 (70/250*0.9=0.252).

The consumer purchasing-weighted cost of the product GD3 is 0.096 (30/250*0.8=0.096).

The consumer purchasing-weighted cost of the product GD4 is 0.14 (50/250*0.7=0.14).

Then, in step S1414, the computing unit 322 computes a consumer weighted score of each of the products GD1 to GD4. The consumer time-weighted cost computed above is different in importance from the consumer purchasing-weighted cost. According to the importance, the importance weight could give in the following table IV.

TABLE IV

|  | Consumer time-weighted cost | Consumer purchasing-weighted cost |
|---|---|---|
| Importance weight | 0.7 | 0.3 |

The computing unit 322 may perform a weighted average on the consumer time-weighted cost and the consumer purchasing-weighted cost of each of the products GD1 to GD4 to obtain the consumer weighted score of each of the products, as described below.

The consumer weighted score of the product GD1 is 0.4805 (0.515*0.7+0.4*0.3=0.3605+0.12=0.4805).

The consumer weighted score of the product GD2 is 0.196 (0.172*0.7+0.252*0.3=0.1204+0.0756=0.196).

The consumer weighted score of the product GD3 is 0.0337 (0.007*0.7+0.096*0.3=0.0049+0.0288=0.0337).

The consumer weighted score of the product GD4 is 0.0567 (0.021*02.7+0.14*0.3=0.0147+0.042=0.0567).

Figure 6:
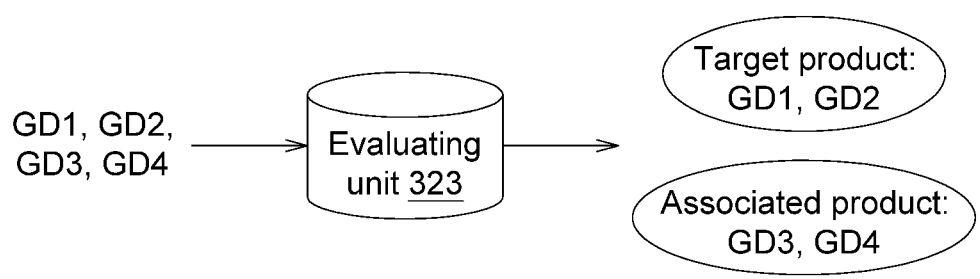
FIG. 6 illustrates an example of an evaluating unit.

Next, please refer to FIG. 6, which illustrates an example of the evaluating unit 323. In step S1415, the evaluating unit 323 classifies the products GD1 to GD4 according to the consumer weighted score of the products GD1 to GD4, and classifies the consumption intention Clijk of the products GD1 to GD4 as the target product or the associated product. In this step, the evaluating unit 323 performs classifying via a K-means algorithm.

Figure 7:
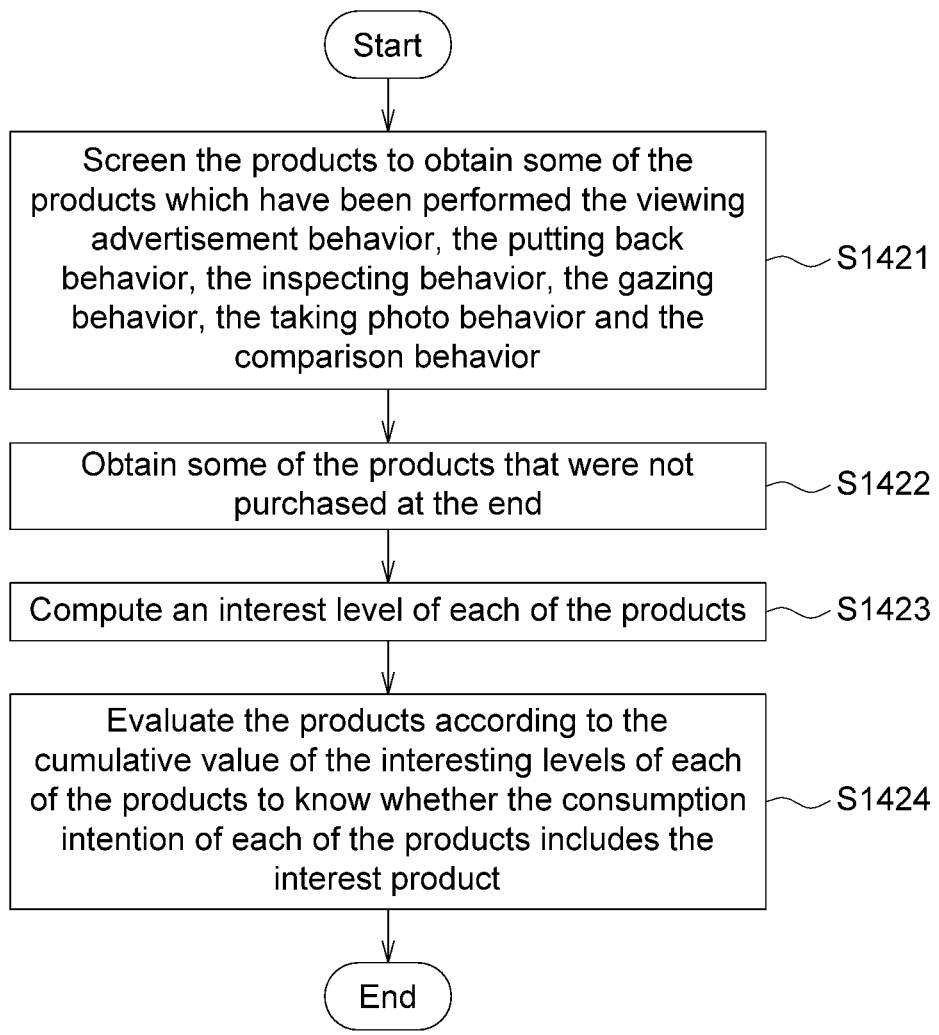
FIG. 7 shows a flowchart of a method for analyzing an interest product according to an embodiment.

Please refer to FIG. 7, which shows a flowchart of a method for analyzing the interest product according to an embodiment. In step S1421, the data screening unit 321 screens the products GDj to obtain the products GD1, GD2, GD3, GD4, GD5, GD6, GD8 which have been performed the viewing advertisement behavior, the putting back behavior, the inspecting behavior, the gazing behavior, the taking photo behavior and the comparison behavior.

Next, in step S1422, the data screening unit 321 further obtains some of the products GD5, GD6, GD8 that were not purchased at the end.

Then, in step S1423, the computing unit 322 computes an interest level of each of the products GD5, GD6, GD8.

The interesting level of the viewing advertisement behavior, the putting back behavior, the inspecting behavior, the gazing behavior, the taking photo behavior and the comparison behavior could be given in the following table V. The higher the cumulative value of the interesting level, the more likely it is an interest product.

TABLE V

| | Viewing advertisement behavior | Gazing behavior | Putting back behavior | Inspecting behavior | Taking photo behavior | Comparison behavior |
|---|---|---|---|---|---|---|
| Product attention weight | 0.1 | 0.3 | 0.5 | 0.8 | 0.9 | 1 |

The consumer CMi performs the comparison behavior on the product GD5 twice, performs the inspecting behavior on the product GD5 once, performs the gaining behavior on the product GD6 once, performs the taking photo behavior on the product GD6 once, and performs the viewing advertisement behavior on the product GD8 once.

The computing unit 322 could compute the cumulative value of the interest levels of the consumer interactive behaviors ACijk corresponding to each of the products GD5, GD6, GD8, as described below.

The cumulative value of the interesting levels of the product GD5 is 2.8 (1+1+0.8=2.8).

The cumulative value of the interesting levels of the product GD6 is 1.2 (0.3+0.9=1.2).

The cumulative value of the interesting levels of the product GD8 is 0.1.

Then, in step S1424, the evaluating unit 323 evaluates the products GD5, GD6, GD8 according to the cumulative value of the interesting levels of each of the products GD5, GD6, GD8 to know whether the consumption intention Clijk of each of the products GD5, GD6, GD8 includes the interest product. For example, the cumulative value of the interest levels of the products GD5 and GD6 is greater than a critical value (for example, 1), so the evaluating unit 323 knows that the consumption intention Clijk of each of the products GD5, GD8 contains the interest product.

Figure 8:
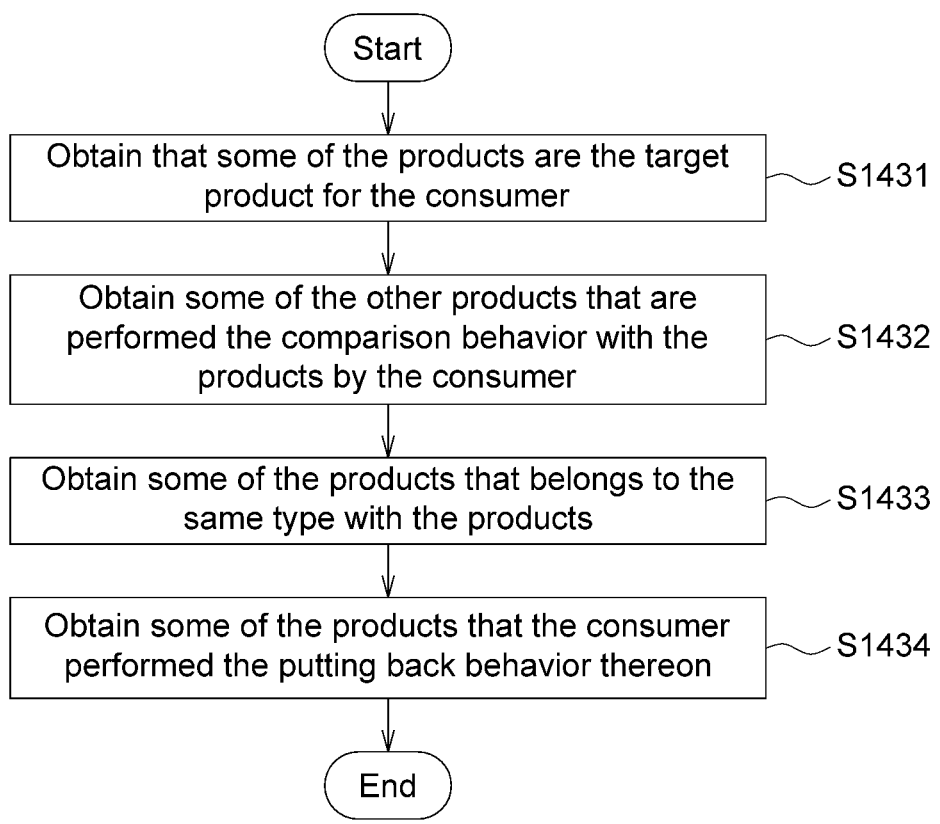
FIG. 8 shows a flowchart of a method for analyzing a substitute product according to an embodiment.

Please refer to FIG. 8, which shows a flowchart of a method for analyzing the substitute product according to an embodiment. First, in step S1431, the data screening unit 321 obtains that some of the products GDj are the target product for the consumer CMi. In the foregoing example, the products GD1 and GD2 are the target product for the consumer CMi.

Next, in step S1432, the data screening unit 321 obtains some of the other products GDj that are performed the comparison behavior with the products GD1, GD2 by the consumer CMi. For example, the consumer CMi compared the product GD1 with the product GD3; the consumer CMi compared the product GD1 with the product GD5; the consumer CMi compared the product GD2 with the product GD9, so the products GD3, GD5, GD9 are screened out in this step.

Then, in step S1433, the data screening unit 321 obtains some of the products GD3, GD5, GD9 that belongs to the same type with the products GD1, GD2. For example, the product GD1 and the product GD3 belong the same type; the product GD2 and the product GD5 belong the same type, so the products GD3, GD5 are screened out in this step.

Next, in step S1434, the data screening unit 321 obtains some of the products GD3 and GD5 that the consumer CMi performed the putting back behavior thereon. For example, the consumer CMi has put back the product GD5, so the product GD5 is filtered out in this step. It is known that the consumption intention Clijk of the product GD5 contains the substitute product.

Figure 9:
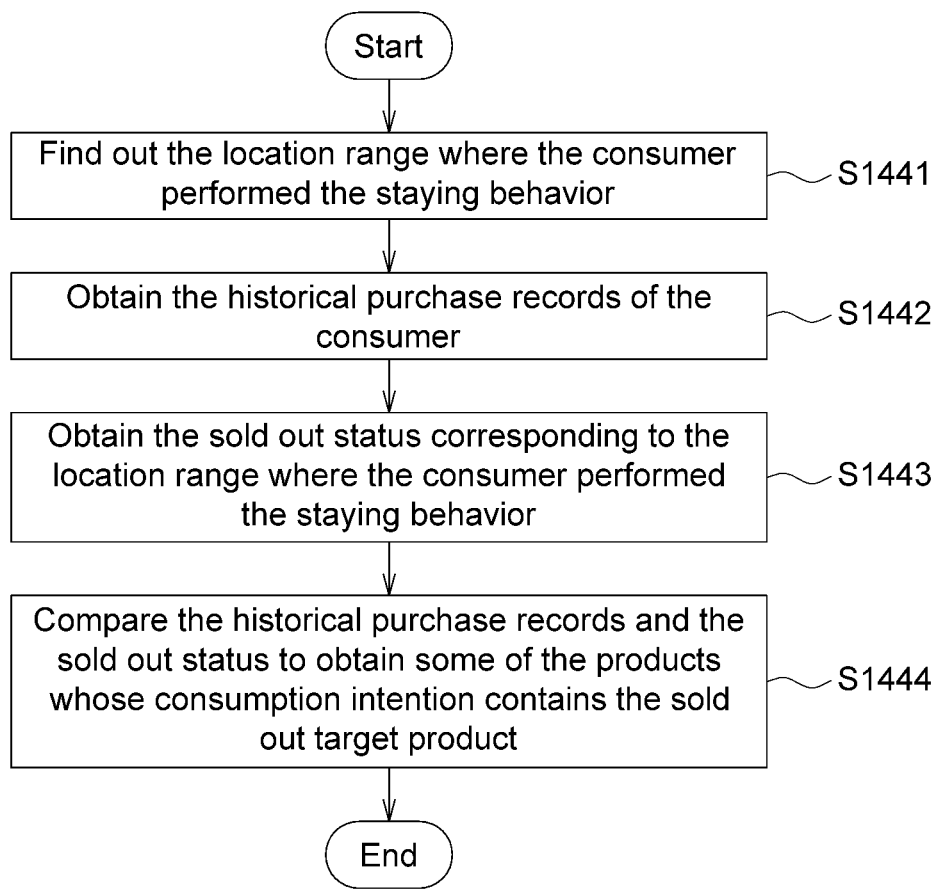
FIG. 9 shows a flowchart of a method for analyzing a sold out target product according to an embodiment.

Please refer to FIG. 9, which shows a flowchart of a method for analyzing the sold out target product according to an embodiment. In step S1441, the data screening unit 321 finds out the location range where the consumer CMi performed the staying behavior.

Next, in step S1442, the data screening unit 321 obtains the historical purchase records of the consumer CMi. For example, the historical purchase records of the consumer CMi records that the products GD1, GD2, GD7 have been purchased.

Then, in step S1443, the data screening unit 321 obtains the sold out status corresponding to the location range where the consumer CMi performed the staying behavior. For example, in the location range where the consumer CMi performed the staying behavior, the product GD7 was sold out.

Next, in step S1444, the evaluating unit 323 compares the historical purchase records and the sold out status to obtain some of the products GDj whose consumption intention Clijk contains the sold out target product. For example, the historical purchase records of the consumer CMi records that the products GD1, GD2, GD7 are frequently purchased, and the product GD7 were sold out at that time, so the product GD7 whose consumption intention Clijk is the sold out target product is obtained in this step. Among the products that have been purchased, if the ratio of the number of purchases of the product to the total number of purchases is greater than a minimum support degree, then that the product is frequently purchased.

As shown in FIG. 4, after obtaining the consumption intentions Clijk of the products GDj in the step S140, the process proceeds to step S150.

In step S150, the estimating device 330 estimates the best product combination of products GDj according to the consumption intentions Clijk. The estimating device 330 includes a setting unit 331, a temporary storage unit 332, a predicting unit 333, an analyzing unit 334, an accumulating unit 335, and an optimizing unit 336. The setting unit 331, the temporary storage unit 332, the predicting unit 333, the analyzing unit 334, the accumulating unit 335 and/or the optimizing unit 336 is, for example, a circuit, a chip, a circuit board, a program module, a computer program product or a computer readable recording medium. The following is a flowchart to explain the operation of each component in detail.

Figure 10:
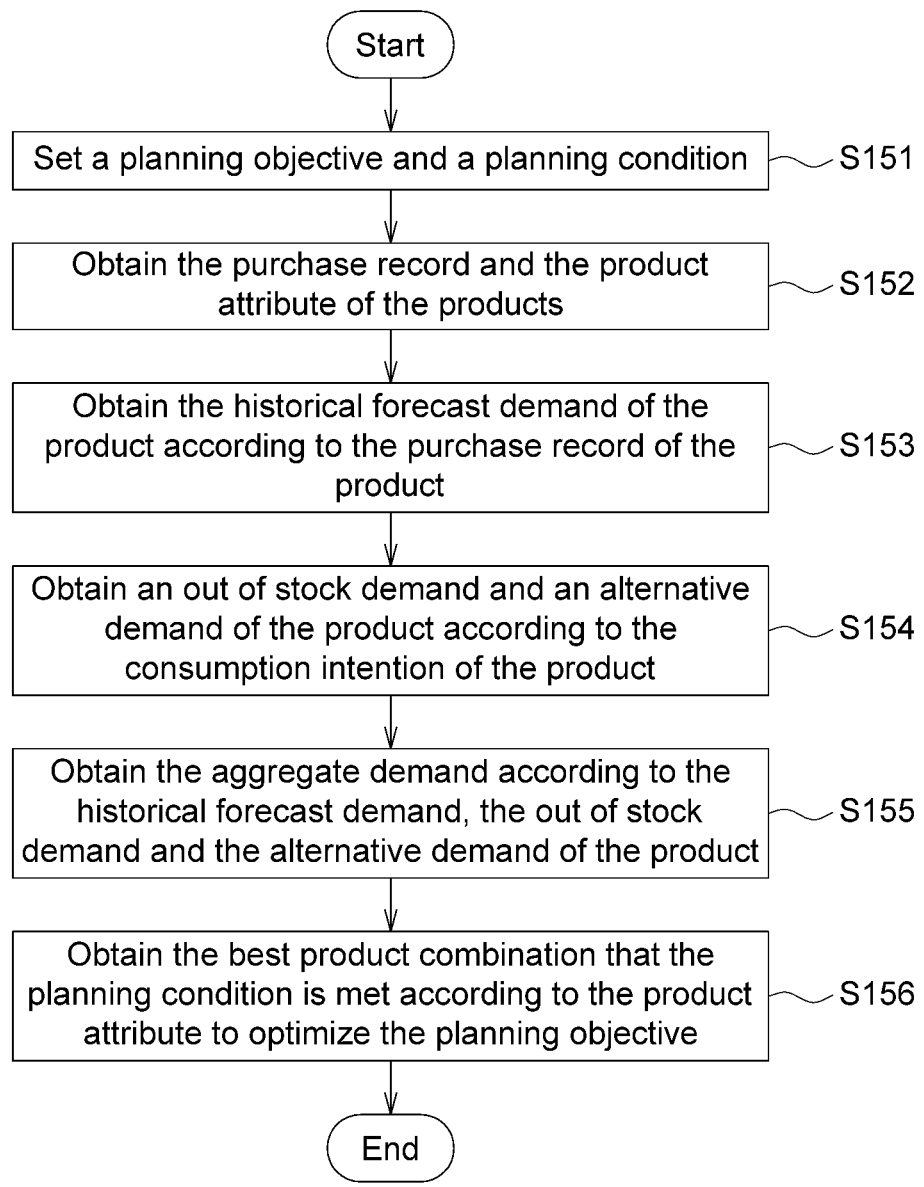
FIG. 10 shows a detailed flowchart of the step S150.

Please refer to FIG. 10, which shows a detailed flowchart of the step S150. In step S151, the setting unit 331 sets a planning objective PG and a planning condition PC. The planning objective PG is, for example, the maximum profit or the maximum sales volume. The planning condition PC is, for example, the number of product items, the proportion of product categories, the necessary items, the items that must be excluded, the proportion of product updates, the updated product category, and the planning period. The planning period is, for example, daily start and end time. In other words, the planning period could be less than one day, and multiple product replacements could be performed in the same day, which could improve the selection of the best product for different periods of time to display, so as to increase the sale amount of the products.

Next, in step S152, the purchase record PR and the product attribute PA of the products GDj are obtained from the temporary storage unit 332. For example, the purchase record PR includes the interactive behavior time sequence record in Table VI and the checkout record in Table VII.

TABLE VI

| Track ID | Behavior ID | Number of behaviors | Date and time | Total time | Purchase ID |
|---|---|---|---|---|---|
| 1 | 1 | 10 | 2021 Jun. 14 12:00:00 | 7:30 | 3 |

| Track ID | Behavior ID | Behaviors | Product | Location | Time |
|---|---|---|---|---|---|
| 1 | 1 | Take | I1 | 1-1 | 0:10 |
| 1 | 2 | Take | I4 | 1-3 | 0:10 |
| 1 | 3 | Compare | I1, I4 | 1-3 | 1:20 |
| 1 | 4 | Put back | I4 | 1-3 | 0:10 |
| 1 | 5 | Take | I2 | 3-2 | 0:10 |
| 1 | 6 | Take | I3 | 3-5 | 0:20 |
| 1 | 7 | Take | I5 | 6-4 | 1:00 |
| 1 | 8 | Put back | I5 | 6-4 | 0:10 |
| 1 | 9 | Stay |  | 7-7 | 2:00 |
| 1 | 10 | Checkout | I1, I2, I3 |  | 1:00 |

TABLE VII

| Checkout ID | Behavior ID | Number | Total price | Time |
|---|---|---|---|---|
| 1 | 1 | 3 | 110 | 2021 Jun. 6 14:00:00 |
| 2 | 1 | 2 | 80 | 2021 Jun. 10 11:30:20 |

| Checkout ID | Item ID | Product | Number | Unit price |
|---|---|---|---|---|
| 1 | 1 | I1 | 1 | 50 |
| 1 | 2 | I2 | 1 | 20 |
| 1 | 3 | I6 | 1 | 40 |
| 2 | 1 | I6 | 2 | 40 |

The product attribute PA records the category, the brand, the capacity and the other information of the product GDj, as shown in Table VIII.

TABLE VIII

| Product | Category | Brand | Name | Unit price | Cost | Weight | Capacity |
|---|---|---|---|---|---|---|---|
| I1 | Milk | AA | AA Milk | 50 | 25 | 400 | 388 |
| I2 | Yogurt | BB | BB Yogurt | 20 | 10 | 200 | 190 |

Then, in step S153, the predicting unit 333 obtains the historical forecast demand DH of the product GDj according to the purchase record PR of the product GDj. The historical forecast demand DH is estimated according to the actual purchase quantity in the past.

Next, in step S154, the analyzing unit 334 obtains an out of stock demand DO and an alternative demand DS of the product GDj according to the consumption intention Clijk of the product GDj. The analyzing unit 334 could estimate the out of stock demand DO according to the sold out target product in the consumption intention Clijk. The analyzing unit 334 could estimate the alternative demand DS according to the substitute product in the consumption intention Clijk.

Then, in step S155, the accumulating unit 335 obtains the aggregate demand DT according to the historical forecast demand DH, the out of stock demand DO and the alternative demand DS of the product GDj. In this step, the accumulating unit 335, for example, sums up the historical forecast demand DH, the out of stock demand DO, and the alternative demand DS to obtain the aggregate demand DT.

Next, in step S156, the optimizing unit 336 obtains the best product combination CD that the planning condition PC is met according to the product attribute PA to optimize the planning objective PG. The optimizing unit 336, for example, utilizes the Multi-Objective Knapsack Problem (MOKP), Multiobjective Optimization Genetic Algorithm (MOGA), or the Adaptive Population Multi-objective Quantum-inspired Evolutionary Algorithm (APMQEA) to optimize the planning objective PG.

It will be apparent to those skilled in the art that various modifications and variations could be made to the disclosed embodiments. It is intended that the specification and examples be considered as exemplary only, with a true scope of the disclosure being indicated by the following claims and their equivalents.

What is claimed is:

1. An assortment planning method for a smart store, comprising:
    identifying, by an image recognition device, an infrared sensor, or a microwave sensor, a plurality of consumer tracks, wherein identifying the plurality of consumer tracks of a plurality of consumers includes:
        step (1): detecting that one of the consumers enters the smart store;
        step (2): taking a top view picture, identifying a human in the top view picture, and annotating the human in the top view picture;
        step (3): taking other top view pictures every predetermined time, and continuously recording positions of the human in the top view pictures to obtain one of the consumer tracks;
        step (4): returning to the steps (2) and (3) to obtain another one of the consumer tracks, when that another one of the consumers enters the smart store is detected;
        step (5): recording leaving time of each of the consumers; and
        step (6): recording ending time when all of the consumers leave;
    detecting, by a weight sensor, the infrared sensor, a magnetron element, an image recognizer or an RFID sensor, a plurality of consumer interactive behaviors of a plurality of products, wherein the plurality of consumer interactive behaviors at least include a taking behavior and a putting back behavior;
    associating the plurality of consumer interactive behaviors and the plurality of consumer tracks;
    obtaining a plurality of consumption intentions including any instance of consumption intention or the plurality of consumption intentions of a plurality of products as referring to consumers' intent to purchase the plurality of products; and
    determining, via a Multi-Objective Knapsack Problem (MOKP), a product combination of whole of the smart store according to a plurality of aggregate demands each of which includes a historical forecast demand, an out of stock demand and an alternative demands, wherein the out of stock demands and the alternative demands are obtained according to the plurality of consumption intentions, the product combination of whole of the smart store is determined by maximizing $f(\Sigma_{j=1}^{n} E(S_j)*(p_j-c_j), \Sigma_{j=1}^{n} K_j)$ under a limitation that $E_{j=1}^{n} x_j \leq$ number of product to list, $E(S_j)$ is a forecast sale volume of each of the plurality of products, $p_j$ is a price of each of the plurality of products, $c_j$ is a cost of each of the plurality of products, $K_j$ is a performance indicator of each of the plurality of products, $x_j$ is a quantity of each the plurality of products, and $(\Sigma_{j=1}^{n} E(S_j)*(p_j-c_j))$ is a profit which is maximized in the MOKP.

2. The assortment planning method for the smart store according to claim 1, wherein the plurality of consumer interactive behaviors further include a viewing advertisement behavior, and a taking photo behavior.

3. The assortment planning method for the smart store according to claim 1, wherein the plurality of consumption intentions include a target product which is a product that one of the consumers is seeking, a substitute product, an interest product which is a product that is putted back by one of the consumers and is not been purchased, a sold out target product which is a product that is purchased by one of the consumers before but is sold out at that time.

4. The assortment planning method for the smart store according to claim 1, wherein the step of obtaining the plurality of consumption intentions includes:
    screening the plurality of products to obtain at least one product corresponding to at least one of a viewing advertisement behavior, the putting back behavior, and a taking photo behavior; and
    obtaining some of the plurality of products that were not purchased.

* * * * *